UNITED STATES PATENT OFFICE.

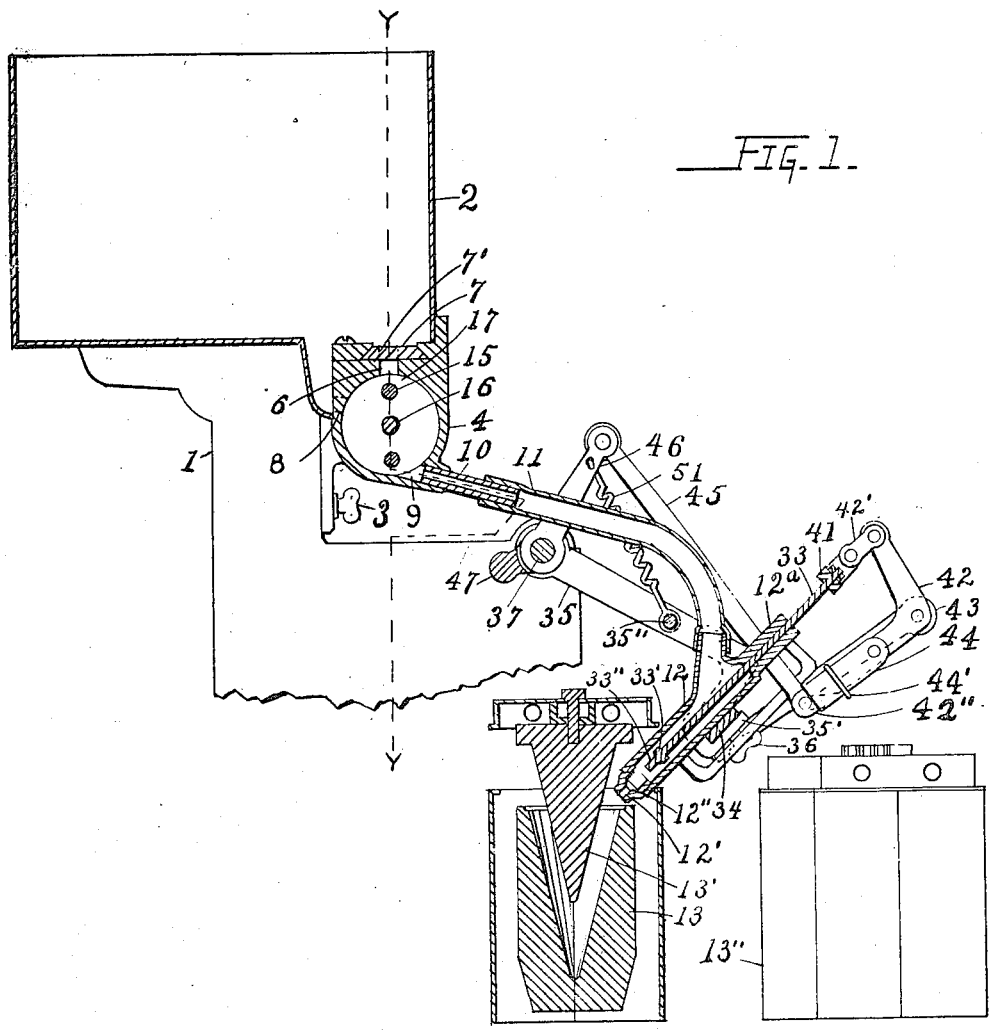

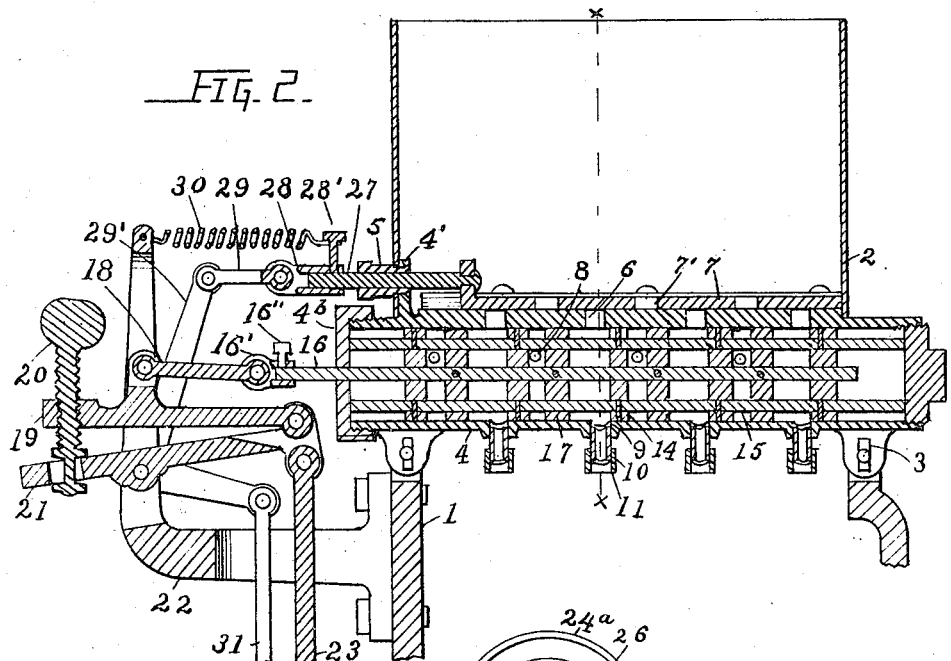
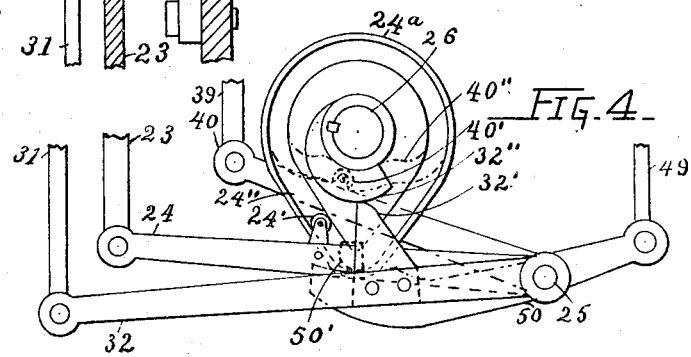
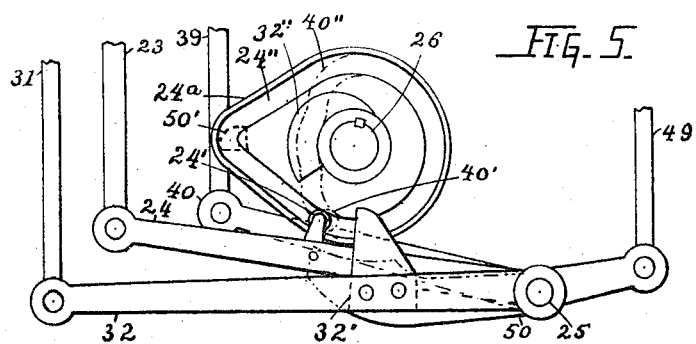

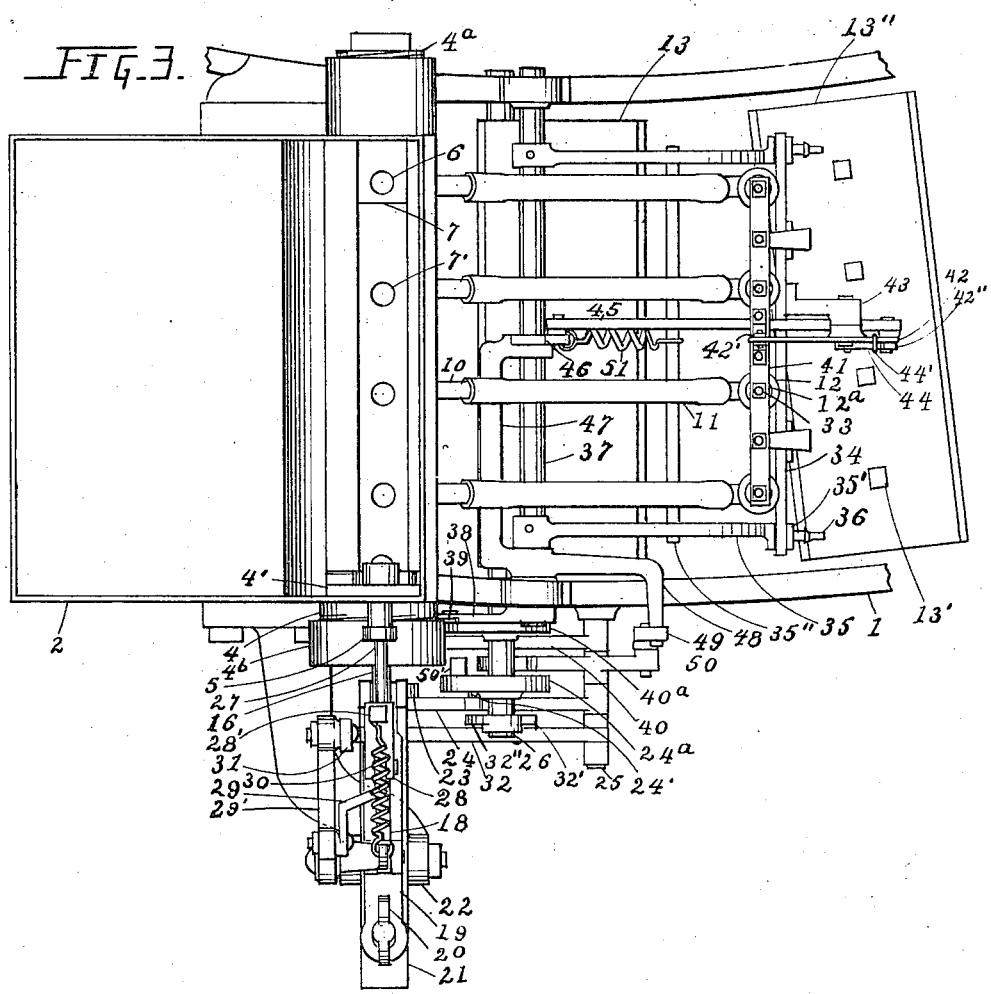

WEBSTER M. ROBERTS AND PARK D. ROBERTS, OF ST. JOSEPH, MISSOURI.

OVEN-FILLING MECHANISM FOR FILLING OVENS WITH BATTER.

1,147,974.

Specification of Letters Patent.

Patented July 27, 1915.

Application filed December 7, 1914. Serial No. 875,958.

*To all whom it may concern:*

Be it known that we, WEBSTER M. ROBERTS and PARK D. ROBERTS, citizens of the United States, residing at St. Joseph, in the county of Buchanan and State of Missouri, have invented certain new and useful Improvements in Oven-Filling Mechanisms for Filling Ovens with Batter, of which the following is a specification, reference being had therein to the accompanying drawing.

Our invention relates to improvements in oven filling mechanisms, for filling baking ovens with batter, and the objects of our improvements are, first:—to provide a substantial, simple and durable mechanism of this class, which shall be particularly adapted to automatically fill, in consecutive order, a plurality of ovens, in which ice cream cones are baked, second;—to so construct said mechanism that all of the parts exposed to the batter, can be easily and quickly separated for cleaning the same, third;—to provide batter adjusting means, whereby the amount of batter with which the ovens are filled can be promptly adjusted as desired; even though the batter forcing means should be worn and allow back leak of batter therepast, and to provide automatic batter returning means, whereby batter is admitted from the batter tank, into the batter forcing means at every stroke of the latter, and, together, with said back leaked batter, is returned to said tank, at every return stroke of said batter forcing means, fourth;—to so construct the batter discharging means, that the same shall be closed at the end of every stroke of the mechanism, by devices which prevent dripping of batter therefrom, and to so arrange a plurality of said discharging means, that they can easily and quickly be attached to the mechanism, and detached therefrom, fifth;—to so construct and arrange the parts of the mechanism, that all of the moving parts shall be properly timed and be prompt and positive in their action. We attain these objects by the mechanism illustrated in the accompanying drawings, in which:—

Figure 1 is a longitudinal section, on the line X X, seen in Fig. 2, looking toward the right, showing the discharging means lowered. Fig. 2 is a vertical section, on the line Y Y, seen in Fig. 1, looking toward the left. Fig. 3 is a top plan of the mechanism, showing the discharging means raised. Fig. 4 is an enlarged front view in detail of the cams and certain parts moved thereby. Fig. 5 is a similar view, showing the cams in different position.

On the frame 1, of a cone baking machine, batter tank 2 is detachably secured by thumb screws 3. The lower front edge of said tank has cylinder 4 rigidly connected therewith. The inner end portion of stem guide 5 is passed through the front wall of said tank and is secured in flange 4', formed on cylinder 4. Said cylinder has a plurality of intake ports 6 formed therethrough, which are opened and closed by slide valve 7, slidably mounted on the top surface of said cylinder. The latter has a like plurality of batter return ports 8, formed therethrough. Said cylinder also has a like plurality of discharge ports 9, each one of which is provided with a nipple 10, connected by a hose 11, with a discharge nozzle 12. Said nozzles are adapted to direct batter into a plurality of ovens 13, of which but one is shown in detail, in Fig. 1. Said discharge ports, nipples, hose and nozzles, for brevity, will hereafter be termed batter directing means.

Referring to Fig. 2, cylinder 4 is divided into a plurality of batter forcing compartments 4'' by a plurality of heads 14, which are evenly spaced and secured on rods 15, held against longitudinal movement by plug 4ª, screwed into the rear end of said cylinder, and apertured cap 4$^b$, screwed onto the front end of cylinder 4. Plunger rod 16 is mounted, slidable through said apertured cap and through said heads, and has a plurality of plungers 17, secured thereon. The outer end of said rod is adjustably secured in sleeve coupling 16', by set screw 16''. Said coupling is connected by link 18, with L crank 19, adjusted as to height by thumb screw 20, secured therethrough and having its lower end rotatably mounted in the outer portion of L crank carrier 21, the central portion of which is oscillatably mounted in bracket 22, which is secure on frame 1. The inner end of said L crank is pivotally connected with the upper end of drive rod 23, the lower end of which is similarly connected with the free end of lever 24, (see Fig. 4.) the opposite end of which is oscillatably mounted on lever stud 25, the rear end of which is secured in frame 1. The central portion of said lever has friction roll 24' rotatably mounted thereon, said roll being in, and moved by the inverted pear shaped channel 24″, formed in cam plate 24ᵃ. Said cam plate is secured on cam shaft 26, rotatably mounted in frame 1. Said cam shaft is rotated clockwise, by parts that form no part of our invention, and are therefore neither shown nor described.

Referring to Fig. 2, slide valve 7 has slide ports 7′ formed therethrough and has the inner end of slide stem 27 securely connected therewith. Said stem is mounted slidable through stem guide 5 and has its outer end adjustably secured in sleeve coupling 28, by set screw 28′. Said coupling is link connected by link 29, with L crank 29′, oscillatably mounted on bracket 22. Spring 30 has one of its ends connected with set screws 28′, while its other end is connected with the upper end of bracket 22, for recovering the hereinafter described stroke of slide valve 7. The lower end of L crank 29′ is pivotally connected with the upper end of slide valve drive rod 31, the lower end of which is similarly connected with the free end of lever 32, (see Fig. 4,) the opposite end of said lever being oscillatably mounted on lever stud 25. The central portion of lever 32 has block 32′ secured thereon, which latter is pressed downward by the semi-crescent shaped cam 32″, secured on cam shaft 26, thereby overcoming spring 30 and moving slide valve 7, (see Fig. 2,) toward the right.

Since nozzles 12 are alike in their construction and operation, a detailed description of one nozzle is deemed sufficient. Referring to Fig. 1, said nozzle has a reduced, straight discharge bore 12′ formed in its lower end, said bore being connected with the interior of the nozzle by the flared valve seat 12″. Said nozzle also has nozzle valve stem guide 12ᵃ formed on its upper end, in which nozzle valve stem 33 is slidably mounted. The lower end portion of said stem has nozzle valve 33′ formed therewith, below which said stem terminates in a plug 33″, adapted to neatly fit said bore 12′. Said plug is of such length, that its bottom surface comes flush with the bottom surface of said nozzle, when it is lowered for closing said nozzle, and thus ejects all of the batter from said bore. Said nozzle is rigidly secured to nozzle bar 34, the ends of which are detachably secured in the hooks 35′, formed on the free ends of arms 35, by set screws 36, seen also in Fig. 3. The central portion of said arms are connected by tie rod 35″, while the other ends of said arms are secured on rock-shaft 37, oscillatably mounted on frame 1. On one end of said rock-shaft is secured the crank 38, which is pivotally connected with the upper end of nozzle lift rod 39, (see Figs. 3 and 4,) the lower end of said rod being similarly connected with the free end of nozzle lift lever 40. Said lever has one of its ends pivotally mounted on lever stud 25, and has friction roll 40′ rotatably mounted on the central portion thereof. Said roll is in engagement with channel 40″, formed in cam plate 40ᵃ, secured on cam shaft 26. Said channel is of such form, that it moves said roll and its connected parts in such manner, that nozzles 12 are thereby moved upward and retained in position above oven 13, for a predetermined length of time, and are lowered therefrom to the position seen in Fig. 1, and thus held for another predetermined length of time.

The upper ends of nozzle stems 33 are secured to stem bar 41, which is link connected with L crank 42, by link 42′. Said L crank is pivotally mounted on the upper end of bracket 43, the lower end of which is secured on nozzle bar 34. The lower end of said L crank has bearing hook 42″ formed therein, the open side of said hook being closed by plate 44, swingably mounted on L crank 42. Said plate is detachably held in position, by link 44′, slidably mounted around said plate and L crank. Said parts form detachable connecting means, whereby the outer end of connecting rod 45 is detachably connected with L crank 42. The inner end of said rod is pivotally connected with crank 46, formed with the inner end of rock-shaft 47, oscillatably mounted on rock-shaft 37.

The outer end of shaft 47 has crank 48 formed therewith, similarly connected with the upper end of nozzle valve operating rod 49, the lower end of which is pivotally connected with the right end of lever 50, the central portion of said lever being pivotally mounted on lever stud 25. The free end of lever 50 is contacted by cam stud 50′, secured on cam plate 24ᵃ, which by the described parts, lifts nozzle valves 33′ from their closed position, (not shown,) to the position seen in Fig. 1, and thus holds said valves for a predetermined length of time. One end of valve recover spring 51 is connected with crank 46, while its opposite end is connected with tie rod 35″.

In operation, with the parts in the position seen in Figs. 3 and 5, tank 2 is filled with batter, (not shown,) which gravitates therefrom, through slide valve ports 7′ and intake ports 6, into cylinder 4, power is applied, which rotates cam shaft 26, (as previously stated,) and for synchronously operating ovens 13 and 13″, therewith, as hereinafter described.

Ovens 13 and 13″ are part of a plurality of ovens, which are alike in their construction and operation, and are moved in a circular, horizontal plane, by steps, for bringing them successively in position beneath nozzles 12. Since said ovens, their oven carrier and operating means for the same may be formed in various ways, and are not part of this invention, the same are neither fully shown nor described, and it is deemed sufficient to describe the movements of such parts of the ovens, as act synchronously with the filling mechanism.

While the described cams are being rotated from the position seen in Fig. 5, to the position seen in Fig. 4, the following described operations are thereby caused to take place. Cam channel 40ª, moves friction roll 40′ upward, thereby raising the free end of lever 40, which by the described connected parts lowers nozzles 12 from the position seen in Fig. 3 to the position seen in Fig. 1. After said nozzles are thus lowered, stud 50′ is carried by cam plate 24ª into contact with lever 50, thereby lowering the free end of said lever, which by its nozzle valve operating parts, lifts valve 33′ from seat 12″, to the position seen in Fig. 1. During these operations, the semi-crescent cam 32ª, moves block 32′ downward, thereby similarly moving the free end of lever 32, which by its connected parts, moves slide valve 7 toward the right, from the position seen in Fig. 3, to the position seen in Fig. 2 for closing intake ports 6. After said intake ports are thus closed, cam slot 24ª moves friction roller 24′ downward, which, by lever 24 and its parts moves plungers 17 toward the right, thereby forcing batter from cylinder 4, described batter conducting means, into oven 13. At the same time batter from tank 2, freely flows through return ports 8, into cylinder 4, following said plungers. When this stroke of plungers 17 has reached its limit, cam 32ª will have passed block 32′, thereby releasing lever 32. At this juncture, recover spring 30 instantly recovers the previously described movement of slide valve 7, thereby opening cylinder intake ports 6. While this is being done, and before said ports are open, stud 50′ will have passed the free extremity of lever 50, thereby releasing said lever, upon which spring 51 recovers the described movement of the nozzle valve operating parts, which lowers plug 33″ into bore 12′, which ejects all of the batter from said bore and seats valve 33′ on seat 12″, without spraying the batter, as is done by the old, well known valves, which act as spray plugs while being closed. Immediately following the described operations cam slot 40″ moves friction roll 40′ downward from the position seen in Fig. 4, to the position seen in Fig. 5, thereby reversing the described operation of the nozzle lifting means which lifts said nozzle 12 from the position seen in Fig. 1, to the position seen in Fig. 3, clear of oven 13. After said nozzle is thus lifted, ovens 13 and 13″ are moved toward the left and stopped with oven 13″ in the position of oven 13. Oven core 13 is lowered to closed position and the core of oven 13″ is raised to the position of core 13, seen in Fig. 1. While said ovens are thus being moved, slide valve 7 is again moved toward the left, again uncovering intake ports 6, after which cam slot 24ª moves friction roll 24′ upward, thereby moving plungers 17 toward the left, upon which batter again passes from tank 2 through intake ports 6, into cylinder 4. During this movement, said plungers eject batter from cylinder 4, through return ports 8, into tank 2.

The previously described operations are repeated for filling oven 13″ with batter, and are automatically repeated, for filling the previously described plurality of ovens in succession. It will be understood that said ovens are all provided with heating means, (not shown,) except where the oven operations are performed, and that the excepted ovens contain a large amount of residual heat. If the described oven filling operations are stopped for any considerable length of time said residual heat, radiating from said excepted ovens, causes the small body of batter in hose 11 and nozzles 12 to become thickened, thereby stopping said hose and nozzles, and preventing batter from being forced therethrough. To prevent such, said plurality of nozzles and their hose are detached from the mechanism, in following manner. Hose 11 are manually moved from nipples 10, thumb screws 36 are loosened, link 44′ is slid upward on L crank 42 for releasing plate 44, which latter is swung on its pivot, until its free end clears hook 42″, from which latter the thus released end of connecting rod 45 is lifted, after which bar 34 is lifted from hooks 35′, and the entire batter conducting means is removed. The same are returned to the position shown, by reversing these operations. The interior of cylinder 4 is exposed and the parts therein contained are removed in the following manner, for cleaning the same. Set screw 16″ is loosened, plug 4ª is unscrewed from the rear end of cylinder 4, plunger rod 16 is moved toward the right until a portion of the parts in said cylinder protrude therefrom, after which said parts are grasped and removed through the thus opened end of cylinder 4. Cap 4ᵇ is then unscrewed from the front end of said cylinder. For removal of tank 2 from frame 1, set screw 28′ is loosened, thumb screws 3 are unscrewed from frame 1, and the thus released tank is removed. These described operations are reversed for replacing the parts.

Having fully described our invention, what we claim as new, and desire to secure by Letters Patent is:—

1. In a mechanism of the class described; a cylinder having both ends open said cylinder being adapted to have batter inducted therein from a batter tank and ejected therefrom through batter outlets: a plurality of evenly spaced heads placed transversely in said cylinder for dividing said cylinder into a plurality of evenly spaced compartments said heads being adapted to have a plunger rod slidably passed through the centers thereof; a plurality of head holding rods placed longitudinally in said cylinder with said heads secured on said rods; a plunger rod passed slidably through the centers of said heads; a plunger in each one of said compartments, said plungers being secured on said plunger rod and being slidable on said holding rods; removable end closing means whereby both of the ends of said cylinder are closed and whereby said holding rods are held against longitudinal movement; and plunger rod reciprocating means detachably connected with said rod; the whole forming a multiple batter forcing mechanism combined into one unit which is removable from said cylinder.

2. In an oven filling mechanism the combination with a cylinder and with a batter forcing plunger adapted to be reciprocatively moved in said cylinder; of a plunger rod for driving said plunger; adjusting means whereby the length of the movement of said rod is adjusted, said adjusting means comprising an oscillatably mounted L crank carrier; driving means pivotally connected with the inner end of said carrier for oscillating the same; an L crank having its inner end pivotally connected with the upper portion of the inner end of said carrier; a sleeve coupling having its inner end secured on the outer end of said plunger rod; a link whereby the outer end of said coupling is link connected with the upper end of said L crank; and a thumb screw having its lower end loosely mounted in the outer end of said carrier and its intermediate portion screwed through the outer end of said L crank.

3. In an oven filling mechanism, a batter tank; batter forcing means connected with said tank for forcing batter therefrom; a nozzle adapted to discharge flexible batter into a baking oven; batter conducting means whereby said nozzle and said batter forcing means are connected; a nozzle valve for opening and closing said nozzle; a plunger in said batter forcing means; reciprocative plunger driving means whereby said plunger is reciprocatively driven for driving batter through said conducting means and nozzle during its movement in one direction; nozzle valve moving means operated synchronously with said plunger rod driving means whereby said nozzle valve is opened while said plunger is forcing batter and is closed during the recover movement of said plunger, and nozzle moving means synchronized with said valve moving means whereby said nozzle is lowered into proper position for filling an oven with batter.

4. In an oven filling mechanism adapted to fill a plurality of ovens in consecutive order; the combination with batter forcing means adapted to induct batter from a batter tank and to force said inducted batter from said batter forcing means; of a frame whereon said batter forcing means is detachably secured; a plunger in said batter forcing means; plunger moving means whereby said plunger is reciprocatively moved for forcing batter during its movement in one direction; a rock shaft oscillatably mounted on said frame; nozzle carrying arms secured on said rock shaft; a nozzle carrier detachably secured on the free ends of said arms; a nozzle adapted to discharge batter into an oven, said nozzle being secured on said carrier; flexible batter conducting means whereby said batter forcing means and said nozzle are connected; and rock-shaft oscillating means whereby said rock-shaft is oscillated in such manner that said nozzle is thereby lowered into proper position for filling an oven with batter, is held in said lowered position while said plunger is forcing batter and is raised clear of said oven during the recover movement of said plunger.

5. In an oven filling mechanism, a nozzle adapted to discharge batter into a baking oven, said nozzle having a straight bore of reduced diameter formed in its discharge end and a flared valve seat connecting said bore with the interior of said nozzle; a valve stem in said nozzle the upper portion of said stem projecting above said nozzle; a valve formed on the lower end portion of said stem said valve being adapted to be seated on said valve seat; a plug formed on the lower end of said stem below said valve for ejecting batter from said reduced bore without spraying said batter; and moving means whereby said stem is moved longitudinally for inserting said plug in said bore and for seating said valve; and recover moving means for recovering said movement of said stem.

6. In an oven filling mechanism, a plurality of oscillatably mounted nozzle carrying arms; a nozzle bar; securing means whereby the ends of said bar are detachably secured on the free ends of said arms; a plurality of batter nozzles secured on said bar; a valve stem for each one of said plurality of nozzles; valve stem lifting means mounted on said bar for lifting said stems; driving means for driving said lifting means; detachable connecting means whereby said driving means is detachably connected with said lifting means; batter forcing means; flexible batter conducting means detachably connected with said batter forcing means whereby batter is conducted from the latter means into said plurality of nozzles; and oscillating means whereby said arms are oscillated for raising and lowering said nozzles.

7. In an oven filling mechanism; a frame for supporting said mechanism; a batter tank; securing means whereby said tank is detachably secured on said frame; batter forcing means securely connected with said tank; a plunger rod for said batter forcing means; plunger rod driving means for reciprocatively driving said rod; a sleeve coupling having its inner sleeve end detachably secured on the outer end of said plunger rod and its outer end link connected with said driving means; a valve rod for said batter forcing means; valve rod driving means for inwardly driving said valve rod; a valve rod sleeve coupling having its outer end link connected with said valve rod driving means and its inner sleeve end passed onto the outer end of said valve rod; a set screw for detachably securing said valve rod in said sleeve end; a bracket secured on said frame; a spring having its outer end connected with the upper end of said bracket and its inner end detachably connected with said set screw for actuating recover movement of said valve rod; and flexible batter conducting means detachably connected with said batter forcing means.

8. In a mechanism of the class described, a frame for supporting said mechanism; a batter tank mounted on said frame; batter forcing means connected with said tank; driving means for driving said batter forcing means; a slide valve for said batter forcing means; slide valve driving means for driving said slide valve in one direction; a slide valve actuating spring for actuating return movement of said slide valve; a rock-shaft oscillatably mounted on said frame; a pair of arms secured on said rock-shaft; a nozzle detachably mounted on the free ends of said arms; flexible batter conducting means whereby said batter forcing means and said nozzle are connected; a nozzle valve in said nozzle for closing the lower end of the latter; a valve stem for said nozzle valve said stem being projected through the upper end of said nozzle; oscillating means connected with said rock-shaft for oscillating the same and thereby raising and lowering said nozzle synchronously with said driving means; stem driving means for driving said valve stem in one direction and thereby opening said nozzle valve while said nozzle is in its lowered position the central portion of said stem driving means being oscillatably mounted on said rock-shaft; and a spring for recovering the movement of said stem driving means.

In testimony whereof we affix our signatures in the presence of two witnesses.

WEBSTER M. ROBERTS.
PARK D. ROBERTS.

Witnesses:
J. T. IDLET,
E. C. BRUEYGIER.